United States Patent
Chaves et al.

(10) Patent No.: US 8,914,352 B2
(45) Date of Patent: Dec. 16, 2014

(54) NON-EQUIJOIN METADATA

(75) Inventors: Michael Chaves, Cary, NC (US); Kasturi Belur, Raleigh, NC (US); Scott Shelton, Apex, NC (US); Henry Fu, Chapel Hill, NC (US)

(73) Assignee: Teradata US, Inc., Dayton, OH (US)

( * ) Notice: Subject to any disclaimer, the term of this patent is extended or adjusted under 35 U.S.C. 154(b) by 572 days.

(21) Appl. No.: 11/775,462

(22) Filed: Jul. 10, 2007

(65) Prior Publication Data

US 2009/0019017 A1 Jan. 15, 2009

(51) Int. Cl.
*G06F 17/30* (2006.01)

(52) U.S. Cl.
CPC ............... *G06F 17/30448* (2013.01)
USPC ........... 707/714; 707/706; 707/713; 707/715; 707/716; 707/717; 707/718; 707/719; 707/721; 707/722; 707/736; 707/758; 707/781

(58) Field of Classification Search
USPC ............. 707/3, 706, 713–719, 921, 922, 936, 707/958, 781, 999.001–999.004
See application file for complete search history.

(56) References Cited

U.S. PATENT DOCUMENTS

| | | | |
|---|---|---|---|
| 5,584,024 A | 12/1996 | Shwartz | |
| 5,812,840 A | 9/1998 | Shwartz | |
| 6,023,697 A * | 2/2000 | Bates et al. | 707/4 |
| 6,223,186 B1 * | 4/2001 | Rigault et al. | 707/104.1 |
| 6,804,678 B1 * | 10/2004 | Luo et al. | 707/101 |
| 6,836,777 B2 * | 12/2004 | Holle | 707/101 |
| 6,882,993 B1 * | 4/2005 | Lawande et al. | 707/2 |
| 7,054,852 B1 * | 5/2006 | Cohen | 707/2 |
| 2002/0042680 A1 * | 4/2002 | Rigault et al. | 702/19 |
| 2003/0172084 A1 * | 9/2003 | Holle | 707/101 |
| 2005/0192943 A1 * | 9/2005 | Siddiqui et al. | 707/3 |
| 2006/0271529 A1 | 11/2006 | Dhamija et al. | |
| 2008/0270370 A1 * | 10/2008 | Castellanos et al. | 707/4 |

* cited by examiner

*Primary Examiner* — Syling Yen
(74) *Attorney, Agent, or Firm* — Schwegman, Lundberg & Woessner, P.A.

(57) ABSTRACT

The subject mater herein relates to database management and, more particularly, to non-equijoin metadata. Various embodiments described herein provide systems, methods, software, and data structures to facilitate non-equijoins of data. Some such embodiments include a data store to hold metadata describing relationships between database tables. The relationships between database tables may include one or more non-equijoins of tables in the form of one or more table-column pairs of a first table being non-equal to one or more table-column pairs of a second table. In some embodiments, the metadata may be used by a query generator to build query statements including one or more non-equijoin.

10 Claims, 3 Drawing Sheets

NON-EQUIJOIN METADATA

TECHNICAL FIELD

The subject mater herein relates to database management and, more particularly, to non-equijoin metadata.

BACKGROUND INFORMATION

In database systems, to query a database, a query is issued. A query is normally encoded in a query language, such as Structured Query Language ("SQL"). If a query is for data from more than one table, or selected as a function of data stored in one or more tables other than a table data is to be selected from, one or more table joins need to be made. The majority of joins between tables are equijoins. An equijoin is where the column(s) in one table are equal to the column(s) in one or more other tables.

There exist for some database management systems, such as database management systems available from Teradata, query generator tools. These tools receive as input, database table-column pairs for data a user wishes to obtain from the database. The query generator builds a query to fulfill the users request and typically returns a SQL statement string. To build the query statement, the query generator access metadata that describes the database. The metadata may include data to make equijoins between tables.

However, occasionally a join between two tables involves operators other than equals. Such joins are most common between date and date/time columns. Joins of this type are referred to as non-equijoins. Query generators to date have been unable to make non-equijoins by reading the underlying metadata. Working around this limitation requires additional programming effort when using query generators when a non-equijoin is required in a query.

DETAILED DESCRIPTION

Figure 1:
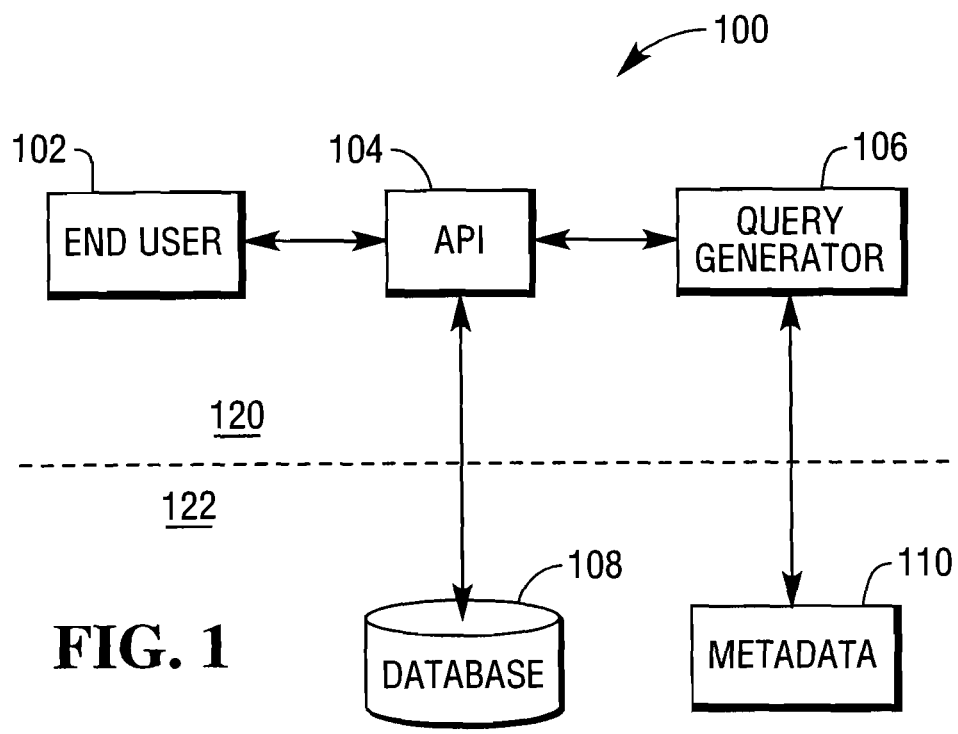
FIG. 1 is a logical block diagram of a system according to an example embodiment.

Equijoins have previously been supported in database management systems including metadata and query generation tools. Non-equijoins have been previously supported by database management systems in the ability to perform a non-equijoin inside the database. However, storage of the non-equijoins in metadata and their use as joins by query generation tools has not been supported. Various embodiments described herein provides systems, methods, software, and data structures to facilitate building of queries including non-equijoins by query generation tools. Some typical embodiments include a data structure holding metadata describing non-equijoins between columns of two or more database tables. This metadata, in some embodiments, the non-equijoin metadata, or the use thereof, includes three properties. First, the order of the tables in making a non-equijoin does not matter. Second, the order of columns in making a non-equijoin does not matter. Third, the non-equal operator of a non-equijoin described in the metadata needs to be smart or when processed, the operator needs to be processed in a smart fashion to facilitate reversal of table-columns pairs with a flipping of the operator to maintain the integrity of the non-equijoin. Further detail of these, and other, embodiments is set forth below.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

An equijoin may be defined by specifying the two tables involved in the join, and one or more pairs of columns, where the first column of each pair is contained in the first joined table and the second column of each pair is contained in the second joined table. So an example join might be:

| | |
|---|---|
| First Table: | tableOne |
| Second Table | tableTwo |
| Column Pair X | tableOne.columnA tableTwo.columnB |
| Column Pair Y | tableOne.columnC tableTwo.columnD |

The point of the definition is to generate SQL "ON" clauses, or equivalent SQL "WHERE" clauses depending on the database management system of a particular embodiment, when building SQL statements. For example the above equijoin could be used to generate the following ON clause:

| | |
|---|---|
| ON | tableOne.columnA = tableTwo.columnB |
| AND | tableOne.columnC = tableTwo.columnD |

In order to facilitate query generation, all joins typically have certain properties, two of these properties are that the order of the tables does not matter and the order of the column pairs does not matter. Equijoins do have these properties when stored in this manner, the above equijoin is totally equivalent to:

| | |
|---|---|
| First Table: | tableTwo |
| Second Table | tableOne |
| Column Pair X | tableTwo.columnB tableOne.columnA |
| Column Pair Y | tableTwo.columnD tableOne.columnC |

By reversing the tables, and it is also equivalent to:

| | |
|---|---|
| First Table: | tableOne |
| Second Table | tableTwo |
| Column Pair Y | tableOne.columnC tableTwo.columnD |
| Column Pair X | tableOne.columnA tableTwo.columnB | by changing the order of the column pairs.

Supporting non-equijoins typically includes one additional piece of information be stored with each column pair. This additional piece of information is the operator used to compare the two columns. The original join, stored to support non-equijoins, looks like.

| | |
|---|---|
| First Table: | tableOne |
| Second Table | tableTwo |
| Column Pair X | tableOne.colunmA operatorX tableTwo.columnB |
| Column Pair Y | tableOne.columnC operatorY tableTwo.columnD |

Equijoins may still be stored in this format by simply setting all operators to "equals." This definition allows SQL ON clauses to be generated in a form, such as:

| | |
|---|---|
| ON | tableOne.columnA operatorX tableTwo.columnB |
| AND | tableOne.columnC operatorY tableTwo.columnD | or assuming that operatorX is "less than or equal to" and operatorY is "greater than or equal to" then the SQL ON clause is:

| | |
|---|---|
| ON | tableOne.columnA <= tableTwo.columnB |
| AND | tableOne.columnC >= tableTwo.columnD |

Non-equijoins still support the two join properties, i.e., the order of the tables does not matter and the order of the column pairs does not matter. Non-equijoins support the second property (order of the column pairs) directly, however the first property, order of the tables, in some embodiments, requires that the operator be "smart" and know how to handle a table reversal. For example, the join:

| | |
|---|---|
| First Table: | tableOne |
| Second Table | tableTwo |
| Column Pair X | tableOne.columnA <= tableTwo.columnB |
| Column Pair Y | tableOne.columnC >= tableTwo.columnD | is NOT equivalent to:

| | |
|---|---|
| First Table: | tableTwo |
| Second Table | tableOne |

-continued

| | |
|---|---|
| Column Pair X | tableTwo.columnB <= tableOne.columnA |
| Column Pair Y | tableTwo.columnD >= tableOne.columnC | but it IS equivalent to:

| | |
|---|---|
| First Table: | tableTwo |
| Second Table | tableOne |
| Column Pair X | tableTwo.columnB => tableOne.columnA |
| Column Pair Y | tableTwo.columnD =< tableOne.columnC | because each operator has been transformed into its "reverse", for example, "greater than or equal to" has been transformed into "less than or equal to". In such embodiments, a non-equijoin is stored in metadata once and another process, such as a query generator handles reversal of the operator, if necessary, based on a determination of the query generator to put one table before another when building an SQL statement.

However, in other embodiments, a non-equijoin may be stored in metadata twice in two distinct forms. For example, the first form may be:

| | |
|---|---|
| First Table: | tableOne |
| Second Table | tableTwo |
| Column Pair X | tableOne.columnA <= tableTwo.columnB |
| Column Pair Y | tableOne.columnC >= tableTwo.colunmD |

And the second form may be:

| | |
|---|---|
| First Table: | tableTwo |
| Second Table | tableOne |
| Column Pair X | tableTwo.columnB => tableOne.columnA |
| Column Pair Y | tableTwo.columnD =< tableOne.columnC |

In such embodiments, the query generator, or other process utilizing the metadata, selects the appropriate form, such as by the needed order of tables for a particular query.

Although the above examples include non-equijoins of data between two columns of a first table and two columns of a second table, non-equijoins may be made between a single column of a first table and a single column of a second table. Other embodiments include non-equijoins of one or more columns of a first table and one or more columns of a second table.

FIG. 1 is a logical block diagram of a system 100 according to an example embodiment. The system 100 includes user and software elements 120 including an end user 102, an application programming interface 104, and a query generator 106. The system 100 further includes data elements 122 including a database 108 and a data store holding metadata 110.

The database 108, in common embodiments, includes data stored in a data storage device under management of a database management system. The database management system is typically a relational database management system. The data in the database 108 is organized by the database management system in tables including columns and rows.

The data store holds metadata describing relationships between database 108 tables. In some embodiments, the data store holding the metadata 110 is one or more tables in the database 108. The metadata 110 typically describes equijoins between database 108 tables. However, the metadata 110 may also describe non-equijoins between database 108 tables. The metadata 110, in some embodiments, describes non-equijoins in a form of one or more table-column pairs of a first table being non-equal to one or more table column pairs of a second table.

In some embodiments, each non-equijoin described in the metadata 110 is described in two forms. The first form may be:

a first table-column pair of a first table+a first non-equal operator+a first table-column pair of a second table; and a second table-column pair of the first table+a second non-equal operator+a second table-column pair of the second table.

The second form may be:

the first table-column pair of the second table+the opposite of the first non-equal operator+the first table-column pair of the first table; and the second table column pair of the second table+the opposite of the second non-equal operator+the second table-column pair of the first table.

In some such embodiments, the first table-column pair of the first table and the second table-column pair of the first table may be the same table-column pair. For example, an insurance policy may have a coverage period stored in a policy table as a start date and an end date. A policy holder may make a claim on the policy. The claim will have a claim date. The insurance company will only pay the claim if the claim date is within the policy period defined by the policy start date and policy end date. Thus, the join of the claim table to the policy table may be made as a non-equijoin. For example:

| ON |
|---|
| claim.claim_date >= policy.policy_start_date |
| claim.claim_date <= policy.policy_end_date |

The end user 102, in some embodiments, may be a piece of software providing an interface to a human user to specify data to be retrieved. The end user 102 in other embodiments may be a process that specifies data to be retrieved. In both situations of the system 100, the end user 102 specifies data to be retrieved to the application programming interface ("API") 104.

The API 104 receives a data request from the end user 102. The data request specifies table-column pairs of data to be retrieved from the database 108. The API 104 transforms the data request into a SQL statement build request for the query generator 106. The API 104, in some embodiments, is a custom developed piece of software developed for a particular embodiment. In other embodiments, the API 104 is a generic data piece of software that may be configured through manipulation of configuration settings. In such embodiments, the configuration settings provide information to the API 104 to put SQL statement requests in a format required by the query generator in view of the specific requirements of the particular embodiment and computing environment.

In some embodiments, the query generator 106 then receives the SQL statement request from the API 104. The SQL statement request, in some embodiments, includes a request for a first table column in view of one or two or more columns of a second table for which a non-equijoin is described in the metadata 110. However, the request may not specify that a non-equijoin is necessary. The query generator 106 processes the SQL statement request in view of metadata 110 the query generator 106 retrieves. The query generator 106 will typically identifies tables to be included in the requested SQL statement and then identify necessary joins between the tables to obtain the requested data. The query generator 106 uses the retrieved metadata to make such determinations.

After the query generator 106 builds the SQL statement, the SQL statement is sent back to the requestor of the statement. In this instance, the requestor was the API 104. The API 104 then causes execution of the SQL statement by submitting the SQL statement to the database 108. The database 108 returns the data to the API 104. In some embodiments, the API 104 may then format the data and present it to the end user 102. In other embodiments, the raw data may be returned by the API 104 directly to the end user 102 or sent to another location, such as storage.

Figure 2:
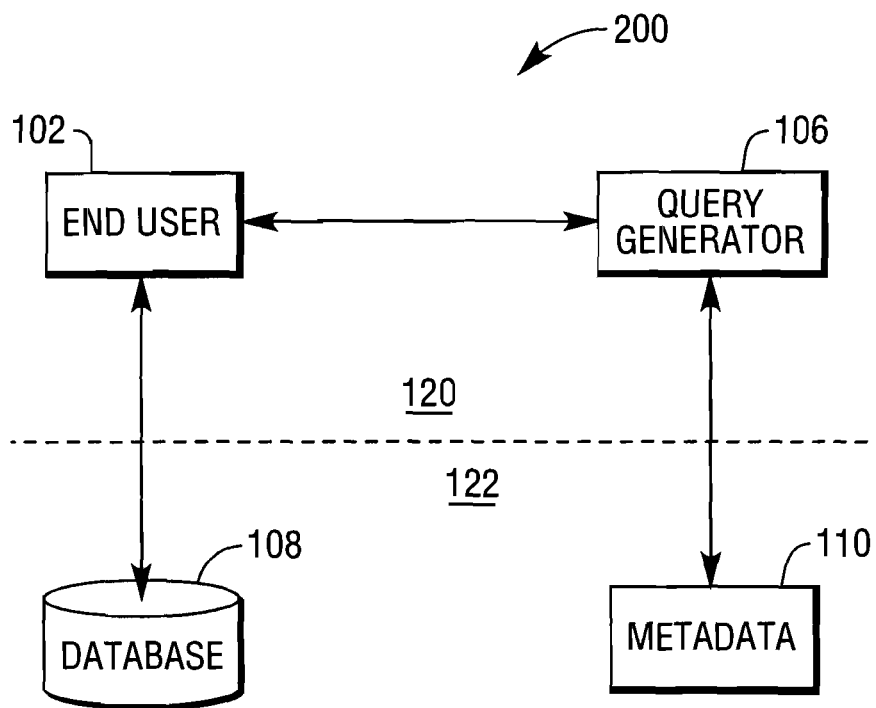
FIG. 2 is a logical block diagram of a system according to an example embodiment.

FIG. 2 is a logical block diagram of a system 200 according to an example embodiment. The system 200 is similar to the system 100 of FIG. 1, but does not include an API 104. Thus, in such embodiments of the system 200, the end user 102 makes SQL statement requests directly to the query generator and issues the returned SQL statements to the database 108 for execution. Other variations of the system 100 may be made and will be readily apparent to one of skill database management system development and use or data processing generally.

Figure 3:
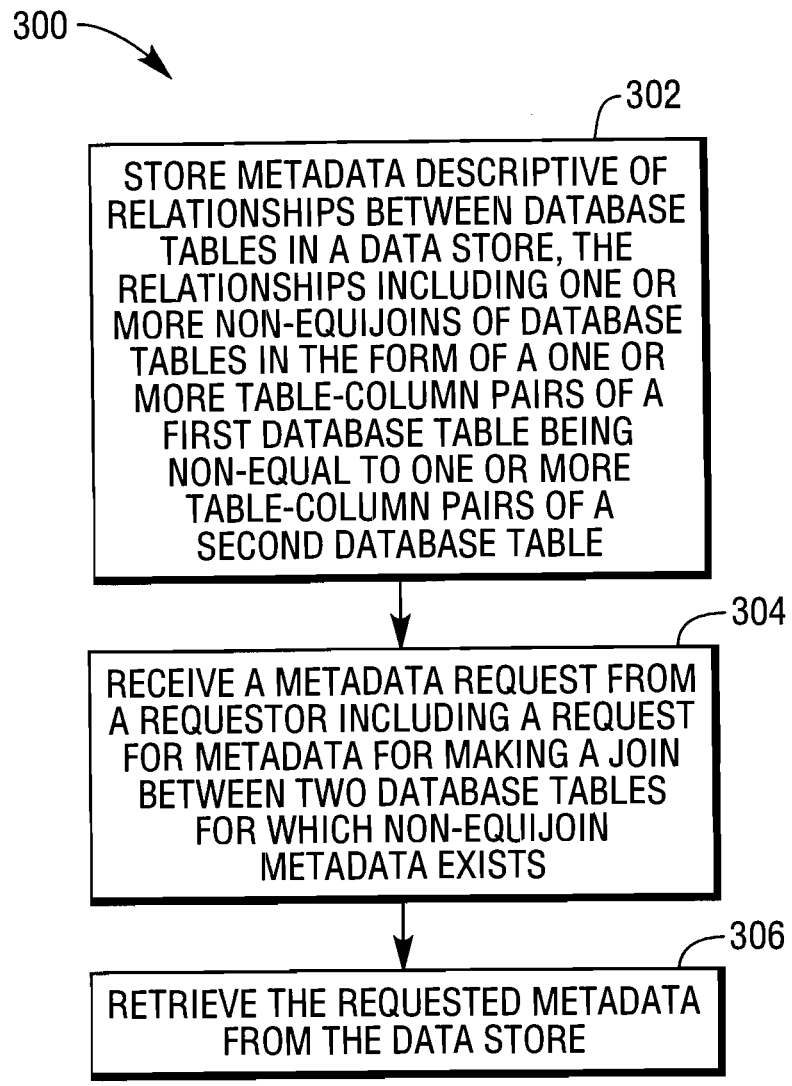
FIG. 3 is a block flow diagram of a method according to an example embodiment.

FIG. 3 is a block flow diagram of a method 300 according to an example embodiment. The method 300 is an example of a method of providing non-equijoin data to a query generator. The example method 300 includes storing metadata descriptive of relationships between database tables in a data store 302. The relationships typically include one or more non-equijoins of database tables in the form of one or more table-column pairs of a first database table being non-equal to one or more table-column pairs of a second database table.

The example method 300 further includes receiving a metadata request from a requester including a request for metadata for making a non-equijoin between two database tables for which non-equijoin metadata exists 304 and retrieving the requested metadata from the data store 306.

Some embodiments of the method 300 also include building a query statement including a representation of the non-equijoin retrieved from the metadata. In some such embodiments, building the query statement includes determining an order of the table-column pairs of the non-equijoin and reversing the non-equijoin operators if the determined order of table-column pairs is reversed from the way the metadata describing the non-equijoin is stored in the data store.

Figure 4:
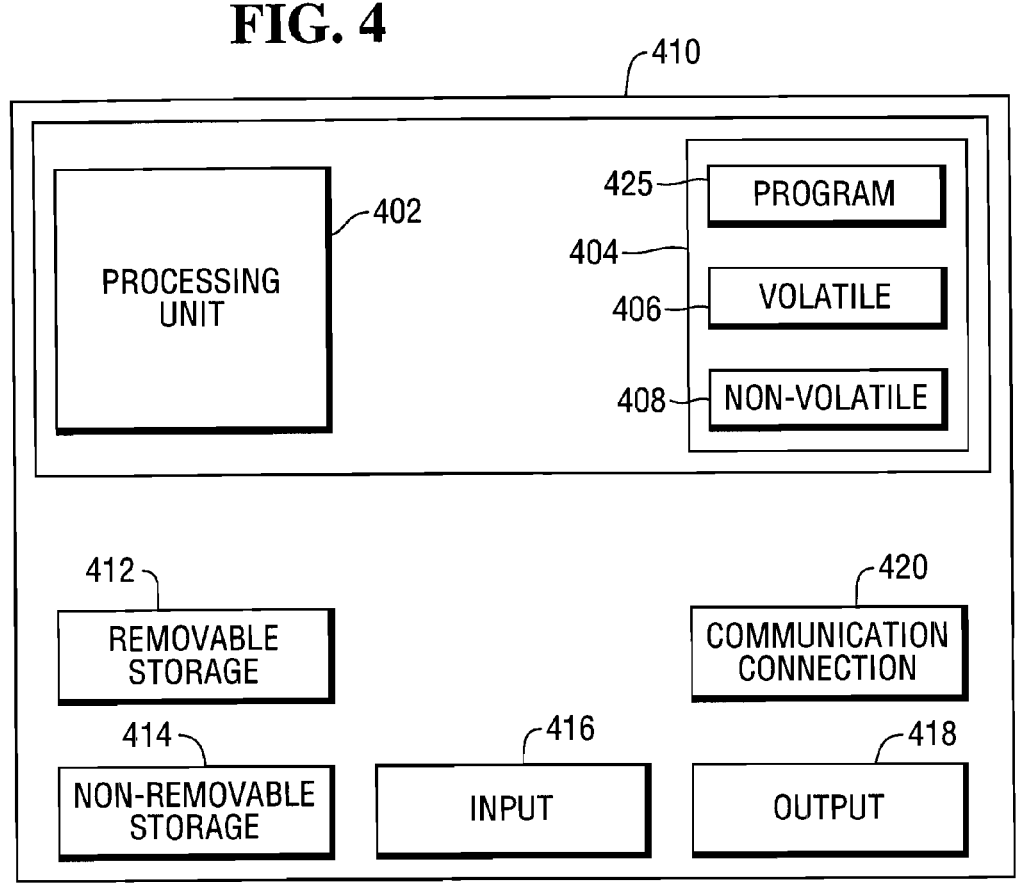
FIG. 4 is a logical block diagram of a computing device according to an example embodiment.

FIG. 4 is a logical block diagram of a computing device according to an example embodiment. One or more computing devices may be included in various embodiments. The software elements 120 of FIG. 1 may execute on and the data elements 122 may be stored in one or more computing devices such as that pictured in FIG. 4.

Returning to FIG. 4, The computing device is a general purpose computing device. In various embodiments, the elements of the computing device may vary depending on the requirements of the specific embodiment. In one embodiment, multiple such computer systems are utilized in a distributed network to implement multiple components in a transaction based environment. An object oriented architecture may be used to implement such functions and communicate between the multiple systems and components. One example computing device in the form of a computer 410, may include a processing unit 402, memory 404, removable storage 412, and non-removable storage 414. Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive, CD-ROM, and RAM are some examples of articles including a computer-readable medium. For example, a computer program 425 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 410 to provide generic access controls in a COM based computer network system having multiple users and servers.)

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A system comprising:
   a processor;
   a data storage device;
   a database, stored on the data storage device, to hold tables of data including columns and rows; the database including a first table, a second table, and metadata, the metadata including a description of a non-equijoin of the first table and the second table including a non-equijoin operator and a correspondence corresponding to a column of the first table and a column of the second table, the non-equijoin operator being at least one of a greater-than operator, a greater-than-or-equal-to operator, a less-than operator, or a less-than-or-equal-to operator;
   a query generator executed by the processor to:
   receive a data request from a requestor, the data request including a request for the column of the first table in view of the column of the second table for which a non-equijoin is described in the metadata; and
   build a query statement using the column of the first table, the column of the second table, and the non-equijoin operator as retrieved from the metadata in the database.

2. The system of claim 1, wherein the database includes a second column of the first table, a second column of the second table, and a second non-equijoin operator corresponding to the second column of the first table and the second column of the second table, wherein the column of the first table and the second column of the first table are paired in a first table-column pair, the column of the second table and the second column of the second table are paired in a second table-column pair, and wherein a non-equijoin pairing between the first table-column pair and the second table column pair are described in two forms, the first form consisting essentially of:
   the column of the first table+the first non-equijoin operator+the column of the second table; and
   the second column of the first table+the second non-equijoin operator+the second column of the second table; and
   the second form consisting essentially of:
   the column of the second table+the opposite of the first non-equijoin operator+the column of the first table; and
   the second column of the second table+the opposite of the second non-equijoin operator+the second column of the first table.

3. The system of claim 2, wherein the column of the first table and the second column of the first table are the same.

4. The system of claim 1, wherein the query generator is further executed by the processor to return the query statement to the requestor.

5. The system of claim 1, wherein the query generator, when building a query, determines an order for the table-column pairs of a non-equijoin and reverses non-equijoin operators if the order of table-column pairs is reversed.

6. A method of providing non-equijoin data to a query generator, the method comprising:
   storing, in a database, a first table, a second table, and metadata, the metadata including a description of a non-equijoin of the first table and the second table including a non-equijoin operator and a correspondence corresponding to a column of the first table and a column of the second table, the non-equijoin operator being at least one a greater-than operator, a greater-than-or-equal-to operator, a less-than operator, or a less-than-or-equal-to operator;
   receiving a data request from a requestor including a request for making a join between the column of the first table and the column of the second table;
   retrieving the non-equijoin operator from the metadata in the database; and
   building a query statement using the column of the first table, the column of the second table, and the non-equijoin operator as retrieved from the database.

7. The method of claim 6, wherein the database includes a second column of the first table, a second column of the second table, and a second non-equijoin operator corresponding to the second column of the first table and the second column of the second table, wherein the column of the first table and the second column of the first table are paired in a first table-column pair, the column of the second table and the second column of the second table are paired in a second table-column pair, and wherein a non-equijoin pairing between the first table-column pair and the second table column pair are described in two forms, the first form consisting essentially of:

the column of the first table+the first non-equijoin operator+the column of the second table; and the second column of the first table+the second non-equijoin operator+the second column of the second table; and the second form consisting essentially of:

the column of the second table+the opposite of the first non-equijoin operator+the column of the first table; and the second column of the second table+the opposite of the second non-equijoin operator+the second column of the first table.

8. The method of claim 7, wherein the column of the first table and the second column of the first table are the same.

9. The method of claim 7, further comprising:

providing the query statement to the requestor for execution.

10. The method of claim 7, wherein building the query statement includes:

determining an order of the table-column pairs of a non-equijoin; and reversing the non-equijoin operator if the determined order of table-column pairs is reversed from the way the correspondence between the column of the first table, the column of the second table, and the non-equijoin operator is stored in the database.

* * * * *